United States Patent [19]

Verschuur

[11] 4,132,365

[45] Jan. 2, 1979

[54] PROCESS FOR PREPARING A STABLE SLURRY OF COAL

[75] Inventor: Eke Verschuur, Amsterdam, Netherlands

[73] Assignee: Shell Oil Company, Houston, Tex.

[21] Appl. No.: 827,194

[22] Filed: Aug. 23, 1977

[30] Foreign Application Priority Data

Jan. 17, 1977 [GB] United Kingdom ............... 1685/77

[51] Int. Cl.² ............................................. B02C 23/18
[52] U.S. Cl. ....................................... 241/21; 241/24; 241/29
[58] Field of Search ....................... 241/20, 21, 24, 29

[56] References Cited

U.S. PATENT DOCUMENTS

| | | | |
|---|---|---|---|
| 2,319,394 | 5/1943 | Erickson | 241/20 |
| 2,330,479 | 9/1943 | Erickson | 241/20 |

Primary Examiner—Granville Y. Custer, Jr.

[57] ABSTRACT

The present invention pertains to the preparation of a stable coal/water slurry by particulating the coal; classifying the coal into two parts on the basis of specific gravity; discarding the ash-rich residue; classifying the lesser specific gravity part of the coal from the preceding classification into two parts; classifying the lesser specific gravity part of the coal from the preceding classification into three parts and grinding the heaviest part to the most fine particles, the next-to-heaviest part to less fine particles, and the lightest part to least fine particles; grinding the coal from the next-to-last classification finer than the heaviest part of the coal of the preceding classification; and combining the coal of the preceding two classifications with water to form a slurry.

7 Claims, No Drawings

PROCESS FOR PREPARING A STABLE SLURRY OF COAL

BACKGROUND OF THE INVENTION

The invention relates to a process for the beneficiation and transportation of coal. The term coal in this specification denotes all solid carbon-containing fuels, such as coal and brown coal. These solid fuels generally contain all kinds of components that do not contribute to the combustion value (such as stone, ash, minerals, sand, clay, et cetera). These components can be present in the coal in a mixture therewith and/or enclosed in the coal itself. The term beneficiation in this specification denotes the partial or complete removal of these components and the conversion of the coal into a more manageable form.

Coal becomes available with the most diverse particle size distributions, in the form of lumps, granules and/or powder. Coal lumps and granules occupy too much space during transport, and often contain ash inclusions. It has therefore already been proposed to grind the lumps, to remove the ash and stone, and to transport the obtained coal particles with water as a slurry through a pipeline.

In the German patent specification, No. 1,120,392, it has been proposed to do this in such a way that the particle size of the coal is related to the specific gravity of the coal in a certain way. The present invention relates to a similar process, i.e. relates to a process for the beneficiation and transportation of coal, in which a slurry of coal particles in water is prepared, the large particles having a low mean specific gravity and the fine particles having a high mean specific gravity and in which this slurry is transported through a pipeline.

In the process according to the above-mentioned German patent specification, this special distribution of the coal particles in the slurry is reached by splitting the coal to be beneficiated into two parts by classification according to specific gravity and by grinding the fraction that has the higher specific gravity to a finer degree than the fraction that has the lower specific gravity. The two fractions are subsequently taken up in water so that a slurry is obtained. In this slurry the specifically heavier particles do not sink more rapidly because they are smaller than the specifically lighter particles, so that the slurry is stable.

In practice this proposal is not completely satisfactory because the slurry is not completely stable after all, and the present invention aims at improving upon this situation.

SUMMARY OF THE INVENTION

In accordance with the present invention, coal is divided by grinding and classification according to specific gravity into at least two carbon-containing fractions. The mean specific gravity of a fraction is higher for a smaller mean particle size. A slurry is prepared from the fractions. According to the invention, a process is provided for preparing a stable coal/liquid slurry by crushing a given quantity of coal, classifying the coal by means of a separation liquid into a part which sinks and is discarded and a part which floats. The part which floats is then again classified by a separation liquid into another part which floats and another part which sinks. The part which sinks is then ground to a very small size and mixed with water to form an aqueous coal slurry. The latter floating part is then ground to a smaller size and classified in such a way that three classifications are obtained varying according to specific gravities. The two larger of the three fractions according to specific gravity are then dried and ground to a small particle size and the third and least heavy fraction is added thereto and an aqueous slurry is formed therefrom.

The slurry of this invention, which has been prepared from at least three special fractions, appears to be much more stable than the above-mentioned slurry of the prior art that has been prepared from two fractions.

According to the invention the coal to be beneficiated and transported is divided into at least three carbon-containing fractions. This division is carried out by classification according to specific gravity and by grinding. While one classification is necessary, several classifications are more desirable. In many cases it will be preferred, after a classification of the coal or of a part of the coal, to classify at least one of the fractions obtained by this classification once more, possibly after grinding. What has just been said about classification is also valid for the grinding.

The term classification in this specification denotes any division according to specific gravity, such as the sorting out with the aid of dense medium separators. This treatment is known in itself and is, as such, not the subject of the invention. With a classification it is possible to divide the coal to be classified into two or more parts with different mean specific gravities.

By the term grinding in this specification is denoted any treatment of coal aiming at a decrease of the mean particle size, such as the treatment with a ball mill.

Grinding, in particular comparatively coarse grinding, can yield a fraction whereof the mean particle size has the required value, but whereof the particle size distribution is too broad. In such a case this fraction can be divided still further by sieving, which sieving is only adequate as long as at least one of the sieved fractions can itself be further treated (for example by grinding) or if such a fraction is used for other purposes than for taking up in the slurry.

With the process according to the invention it is possible to obtain, apart from three or more coal-containing fractions, one or more fractions that consist mainly of ash and/or minerals. These lastmentioned fractions are preferably not taken up in the slurry to be prepared. During the beneficiation of the coal it is possible to carry out the deashing immediately, i.e. with the first classification. After the grinding of a coal fraction, a certain amount of previously-enclosed, and hence inaccessible, ash may have become available, which amount can be separated by deashing. It will be clear that the separation of ash and minerals changes the mean specific gravity of a fraction and that this treatment is in fact a classification.

With the process according to the invention the coal and/or a fraction obtained therefrom is subjected to a classification and to a grinding step or to more than one classification and/or grinding step. The choice of the number of steps and the sequence thereof has an impact on the ultimate result.

A classification that is not followed by either the separation of a fraction that is not intended for the slurry or the grinding of a fraction that will be taken up in this slurry (or yet another treatment of this fraction) has in principle no significance, because the fractions obtained by that classification are ultimately mixed again during the preparation of the slurry.

According to one embodiment of the invention the coal is first, by classification, divided into two parts which have different specific gravities, and subsequently at least one of these parts is first ground and then divided once again by classification into two parts, of which at least one is subsequently ground. In principle, the process is simplest if in all steps the part with the highest specific gravity is ground. In this way a relatively small number of treatments give a slurry with three separate fractions. The degree of separateness, i.e. the width of the particle size distribution and specific gravity, is defined by the degree of selectivity of the classification and by the reliability of the grinding.

According to a different embodiment of the invention, the coal is first, by classification, divided into three parts which have different specific gravities, and subsequently at least the two parts with the highest specific gravities are ground, and the part with the highest mean specific gravity is ground most finely. The question whether this embodiment or the previous one of the invention is preferred also depends on the cost of one classification in three parts compared with that of two classifications in two parts.

It will be clear that with the process according to the invention it is also possible to apply more classifications and/or grinding steps and the slurry can also contain more than three coal fractions. The number of classifications and/or grinding steps can, for example, be larger to obtain one or more ash-containing fractions which will ultimately not be taken up in the slurry.

The invention will hereinafter be further clarified with the aid of an example in which the preparation of a slurry according to the invention and one according to the prior art are discussed and the results compared.

EXAMPLE A

A certain amount of coal as obtained from the mine was crushed to a size range of 0–10 mm. An amount of 1000 g of this crushed coal was stirred through a hydrocarbon-based separation liquid having a specific gravity of 1.8 and allowed to settle. A first amount (196 g) of coal sank to the bottom and was discarded. A second amount floated on or near the surface of the liquid and was removed therefrom and then stirred through a separation liquid having a specific gravity of 1.6 and allowed to settle.

An amount of 202 g was removed from the bottom of the separation-liquid container, dried and ground in a mill to a size of below 0.15 mm. The powder obtained was subsequently mixed with 800 g of water to obtain an aqueous coal slurry.

The fraction of coal floating on or near the surface of the last-mentioned separation liquid, amounting to 584 g, was ground to below 1.5 mm and subsequently classified in such a way that fractions with the following specific gravities were obtained:

(a) s.g. 1.4–1.6, 182 g
(b) s.g. 1.2–1.4, 206 g
(c) s.g. < 1.2, 194 g–;

Fractions (a) and (b) were dried and respectively ground to particle sizes below 0.5 mm (fraction (a)) and below 1 mm (fraction (b)). The ground fractions and fraction (c) as such were added to the above-mentioned aqueous slurry. In the final slurry thus obtained, the particle sizes were coupled to the specific gravities as follows:

|  | Specific Gravity | Particle Size |
| --- | --- | --- |
| slurry | 1.8 – 1.6 | <0.15 mm |
| fraction (a) | 1.6 – 1.4 | <0.5 mm |
| fraction (b) | 1.4 – 1.2 | <1 mm |
| fraction (c) | <1.2 | <1.5 mm |

The final slurry proved to contain 49.5%w solids, of which 14.7%w consisted of particles smaller than 0.044 mm, 28.9%w of particles smaller than 0.25 mm and 9.8%w of particles larger than 1 mm.

After having been stirred vigorously, the slurry was allowed to stand for 48 hours after which the bulk part of the liquid, below a relatively clear top layer, was found to contain 54.6%w solids. This bulk part could easily be poured out of the vessel, only about 2%w of the solids remaining in the vessel.

The above bulk part formed a slurry of coal particles prepared according to the principles of the present invention.

EXAMPLE B

For comparison of the above result with a technique according to the prior art, a slurry was prepared not following the principles of the present invention, as follows.

A second amount of the same coal as before, as obtained from the mine, was crushed to a size range of 0–10 mm. An amount of 1000 g of this crushed coal was stirred through a hydrocarbon-based separation liquid having a specific gravity of 1.8 and allowed to settle. A first amount (199 g) of coal sank to the bottom and was discarded. A second amount floated on or near the surface of the liquid and was removed therefrom and then stirred through a separation liquid having specific gravity of 1.4 and allowed to settle.

An amount of 407 g was removed from the bottom of the separation-liquid container, dried and ground in a mill to a size of below 0.25 mm. The obtained powder was subquently mixed with 800 g of water to obtain an aqueous coal slurry.

The fraction of coal floating on or near the surface of the last-mentioned separation liquid, amounting to 383 g, was ground to below 1.5 mm and subsequently mixed with the above-mentioned aqueous coal slurry. In the final slurry thus obtained, the particle sizes were coupled to the specific gravities as follows:

|  | Specific Gravity | Particle Size |
| --- | --- | --- |
| slurry | 1.8 – 1.4 | <0.25 mm |
| powder | <1.4 | <1.5 mm |

The final slurry proved to contain 49.7%w solids, of which 15.2%w consisted of particles smaller than 0.044 mm, 31.2%w of particles smaller than 0.25 mm, and 8.4%w of particles larger than 1 mm.

After having been stirred vigorously, the slurry was allowed to stand for 48 hours after which the settled layer was found to contain 58.6%w solids. The settled layer only flowed slowly from the vessel and about 10%w of the layer remained in the vessel.

Comparison of the results of the experiments described above under Examples A and B, wherein respectively a slurry according to the invention and a slurry according to the prior art were made, shows that although the particle size distribution of the slurries does not differ widely, the viscosity and stability characteristics do differ substantially. This is explained, according to the invention, from the fact that a special relation between particle size and specific gravity of the coal particles improves these characteristics.

What is claimed is:

1. A process for preparing a stable coal/liquid slurry comprising,
    (a) classifying particulate coal into more than one part on the basis of specific gravity,
    (b) classifying at least the lesser specific-gravity part of the coal from step (a) into more than one part on the basis of specific gravity,
    (c) classifying at least the lesser specificgravity part of the coal from step (b) into more than one part on the basis of specific gravity,
    (d) grinding more than one part of the coal from step (c) into smaller particles of fineness range in reverse order of magnitude to the order of magnitude of the specific gravity of each part which is ground, in relation to each other part which is ground,
    (e) grinding the greater specific gravity part of the coal from step (b) into smaller particles of fineness range less than the fineness range of any of the parts from step (d) which are ground, and
    (f) combining at least some of the parts of coal from step (d), and coal from step (e), to form a slurry.

2. The process of claim 1 wherein the liquid is water.

3. The process of claim 1 wherein the greater specific gravity part from step (a) is an ash-rich residue which is discarded.

4. The process of claim 1 wherein steps (a) and (b) each result in two parts and step (c) results in three parts.

5. The process of claim 4 wherein all three parts of step (c) are ground into smaller particles.

6. The process of claim 5 wherein all of the parts of coal from steps (d) and (e) are combined with water to form a slurry.

7. A process for preparing a stable coal/liquid slurry comprising,
    (a) grinding coal to a size range of up 10 mm,
    (b) classifying at least a part of said coal into more than one part on the basis of specific gravity,
    (c) discarding the greater specific gravity part of the coal from Step (b),
    (d) classifying at least the lesser specific gravity part of the coal from Step (b) into more than one part on the basis of specific gravity,
    (e) grinding at least the greater specific gravity part of the coal from Step (d) to a size of below 0.15 mm,
    (f) mixing the ground coal from Step (e) with water to form an aqueous coal slurry,
    (g) grinding the lesser specific gravity coal from Step (d) to below 1.5 mm.
    (h) classifying the coal from Step (g) such that fractions with the following specific gravities are obtained:
        (1) S.G. 1.4–1.6
        (2) S.G. 1.2–1.4
        (3) S.G. less than 1.2,
    (i) grinding fraction (1) to a particle size below 0.5 mm,
    (j) grinding fraction (2) to a particle size below 1 mm,
    (k) combining fractions from Steps (f), (h-3), (i), and (j) to form an aqueous slurry.

* * * * *